(12) United States Patent
Clemente

(10) Patent No.: US 12,252,579 B2
(45) Date of Patent: Mar. 18, 2025

(54) THERMOPLASTIC POLYURETHANE CONTAINING A POLYSILOXANE CAPROLACTONE POLYOL

(71) Applicant: Lubrizol Advanced Materials, Inc., Cleveland, OH (US)

(72) Inventor: Trinidad Piedra Clemente, Barcelona (ES)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 578 days.

(21) Appl. No.: 17/632,255

(22) PCT Filed: Aug. 3, 2020

(86) PCT No.: PCT/US2020/044742
§ 371 (c)(1),
(2) Date: Feb. 2, 2022

(87) PCT Pub. No.: WO2021/026069
PCT Pub. Date: Feb. 11, 2021

(65) Prior Publication Data
US 2022/0289898 A1    Sep. 15, 2022

(30) Foreign Application Priority Data

Aug. 5, 2019  (EP) .................................... 19382681

(51) Int. Cl.
| | |
|---|---|
| C08G 18/61 | (2006.01) |
| C08G 18/32 | (2006.01) |
| C08G 18/42 | (2006.01) |
| C08G 18/65 | (2006.01) |
| C08G 18/66 | (2006.01) |
| C08G 18/73 | (2006.01) |
| C08G 18/76 | (2006.01) |
| C08G 18/79 | (2006.01) |
| C08G 77/445 | (2006.01) |

(52) U.S. Cl.
CPC .......... *C08G 18/61* (2013.01); *C08G 18/3206* (2013.01); *C08G 18/3215* (2013.01); *C08G 18/4277* (2013.01); *C08G 18/6511* (2013.01); *C08G 18/6637* (2013.01); *C08G 18/73* (2013.01); *C08G 18/7671* (2013.01); *C08G 18/792* (2013.01); *C08G 77/445* (2013.01)

(58) Field of Classification Search
CPC ............................ C08G 18/4277; C08G 18/61
See application file for complete search history.

(56) References Cited

U.S. PATENT DOCUMENTS

| | | | | |
|---|---|---|---|---|
| 5,179,142 A | * | 1/1993 | Ono | C08G 18/61 524/789 |
| 5,945,185 A | * | 8/1999 | Hirai | C08G 18/4854 280/743.1 |
| 8,299,168 B2 | | 10/2012 | Munzmay et al. | |
| 2008/0300377 A1 | * | 12/2008 | Nefzger | C08G 18/4277 528/65 |
| 2011/0102736 A1 | * | 5/2011 | Wu | G02C 7/04 427/164 |
| 2012/0277394 A1 | * | 11/2012 | Taniguchi | C08G 18/0852 252/183.11 |
| 2017/0233572 A1 | | 8/2017 | Boucard et al. | |
| 2022/0289898 A1 | | 9/2022 | Piedra Clemente | |

FOREIGN PATENT DOCUMENTS

| | | |
|---|---|---|
| EP | 1589053 A1 | 10/2005 |
| JP | 5019011 B2 | 9/2012 |

* cited by examiner

*Primary Examiner* — Mark S Kaucher
(74) *Attorney, Agent, or Firm* — Eryn Ace Fuhrer; Michael A. Miller

(57) ABSTRACT

A heat resistant thermoplastic polyurethane composition is made by a reaction including a polyol component comprising the reaction product of a polysiloxane with ε-caprolactone.

10 Claims, No Drawings

THERMOPLASTIC POLYURETHANE CONTAINING A POLYSILOXANE CAPROLACTONE POLYOL

CROSS REFERENCE TO RELATED APPLICATION

This application claims priority from PCT Application Serial No. PCT/US2020/044742 filed on Aug. 3, 2020, which claims the benefit of European Patent Application EP19382681 filed on Aug. 5, 2019, the entirety of both of which is hereby incorporated by reference.

BACKGROUND

The utility of thermoplastic polyurethane materials for a variety of applications is being appreciated in many new industries. However, one drawback often seen with thermoplastic polyurethane materials is a loss of performance when exposed to elevated temperatures.

Thus, there is a need for a thermoplastic polyurethane composition that maintains good physical properties in high heat applications.

SUMMARY OF THE INVENTION

The present invention is a thermoplastic polyurethane composition comprising the reaction product of a polyol component and a polyisocyanate component, wherein the polyol component comprises the reaction product of a polysiloxane with ε-caprolactone, wherein the polysiloxane and ε-caprolactone are reacted in a molar ratio of 1:12 to 1:25, for example 1:12 to 1:15.

In one embodiment, the polyol component comprises

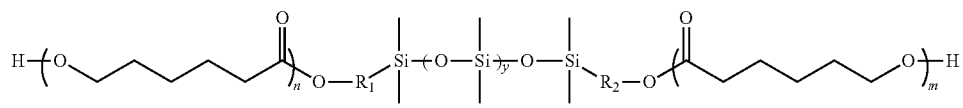

where n and m may be the same or different, n or m may be 0 to 15, provided that n+m is at least 12, for example, 12-15; y may be 25 to 33; $R_1$ and $R_2$ may be the same or different and are linear or branched $C_1$ to $C_{10}$ groups. This polyol component is reacted with a diisocyanate and, optionally, a chain extender to form a thermoplastic polyurethane composition.

DETAILED DESCRIPTION

Thermoplastic polyurethane compositions are generally formed from the reaction product of a polyol component, a diisocyanate component, and optionally, a chain extender component. As described herein, number average molecular weight is determined by assay of the terminal functional groups.

Polyol Component

In the present invention, the polyol component used to prepare the thermoplastic polyurethane composition of the present invention comprises the reaction product of ε-caprolactone initiated with a polysiloxane polyol.

ε-Caprolactone or simply caprolactone is a lactone (a cyclic ester) possessing a seven-membered ring. ε-Caprolactone is a well-known monomer in the art.

Suitable polysiloxane polyols include α-ω-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

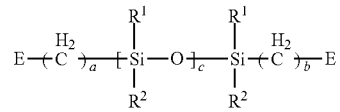

in which: each $R^1$ and $R^2$ are independently, hydrogen, a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Examples of polysiloxane materials that can be used in this invention include di-hydroxypolydimethyl siloxane, α,ω-hydroxypropyl terminated poly(dimethysiloxane) and α,ω-amino propyl terminated poly(dimethysiloxane), both of which are commercially available materials. Further examples include copolymers of the poly(dimethysiloxane) materials with a poly(alkylene oxide).

In one embodiment, the polyol component of the present invention comprises the reaction product of a polydimethylsiloxane and ε-caprolactone wherein the polydimethylsiloxane and ε-caprolactone are reacted in a molar ratio of 1:12 to 1:25, or 1:12 to 15.

In one embodiment, the polyol component useful in the present invention, the polyol component is

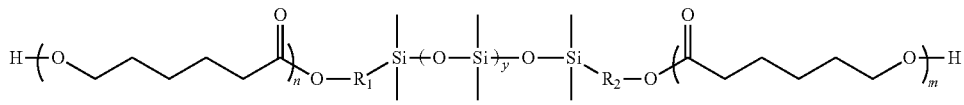

where n and m may be the same or different, n or m may be 0 to 15, provided that n+m is at least 12, for example, 12-15, further for example, 12, 13, 14, or 15; y may be 25 to 33, for example, 25, 26, 27, 28, 29, 30, 31, 32, or 33; $R_1$ and $R_2$ may be the same or different and are linear or branched $C_1$ to $C_{10}$ groups, for example, methyl, ethyl, n-propyl, iso-propyl, n-butyl, iso-butyl, phenyl, cyclohexyl, methoxyethyl, or 3,3'-oxydipropyl. In one embodiment, $R_1$ and $R_2$ are $CH_2$—$CH_2$—$CH_2$.

In one embodiment, the polyol component of the present invention consists essentially of or consists of

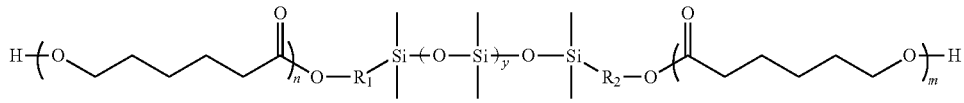

where n or m may be 0 to 15, provided that n+m is at least 12, for example, 12 to 25, or even 12 to 15, further for example, 12, 13, 14, or 15, and y is 25 to 33, for example, 25, 26, 27, 28, 29, 30, 31, 32 or 33; R1 and R2 may be the same or different and are linear or branched C1 to C10 groups, for example, methyl, ethyl, n-propyl, iso-propyl, n-butyl, iso-butyl, phenyl, cyclohexyl, methoxyethyl, or 3,3'-oxydipropyl. In one embodiment, R1 and R2 are CH2-CH2-CH2.

The polyol component may have a number-average molecular weight of about 2000 to 4000, for example, about 3000 to 4000, further for example, about 3500.

Polyisocyanate Component

Polyisocyanates useful for preparing the thermoplastic polyurethane compositions of the present invention include one or more diisocyanates, typically selected from aromatic polyisocyanates or aliphatic polyisocyanates or combinations thereof. Examples of useful polyisocyanates include aromatic diisocyanates such as 4,4'-methylenebis(phenyl isocyanate) (MDI), m-xylene diisocyanate (XDI), 3,3'-di-methoxy-4,4'-biphenylenediisocyanate, phenylene-1,4-diisocyanate (PDI), phenylene-1,3-diisocyanate, naphthalene-1,5-diisocyanate, 3,3'-dimethyl-4,4'-biphenylene diisocyanate (TODI), 1,5-naphthalene diisocyanate (NDI), and toluene diisocyanate (TDI); as well as aliphatic diisocyanates such as isophorone diisocyanate (IPDI), 1,4-cyclohexyl diisocyanate (CHDI), decane-1,10-diisocyanate, lysine diisocyanate (LDI), 1,4-butane diisocyanate (BDI), hexamethylene diisocyanate (HDI), 1,4-Bis (isocyanatomethyl) cyclohexane (1,4-H6XDI), and dicyclohexylmethane-4,4'-diisocyanate (H12MDI). Mixtures of two or more polyisocyanates may be used.

In one embodiment, the polyisocyanate component consists essentially of or consists of 4,4'-methylenebis(phenyl isocyanate). In another embodiment, the polyisocyanate consists essentially of or consists of hexamethylene diisocyanate.

The Chain Extender Component

The thermoplastic polyurethane compositions described herein optionally include a chain extender component. Chain extenders include diols, diamines, and combination thereof.

Suitable chain extenders include relatively small polyhydroxy compounds, for example, lower aliphatic or short chain glycols having from 2 to 20, or 2 to 12, or 2 to 10 carbon atoms. Suitable examples include ethylene glycol, diethylene glycol, triethylene glycol, tetraethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedi-methanol (CHDM), 2,2-bis[4-(2-hydroxyethoxy) phenyl]propane (HEPP), heptanediol, non-anediol, dodecanediol, 3-methyl-1,5-pentanediol, and hydroxyethyl resorcinol (HER), pentaspiro glycol (PSG), hydroquinone bis(2-hydroxyethyl) ether hydroquinone (HQEE), dipropylene glycol (DPG), 2-methyl-1,3-propane diol, 2-butyl-2-ethyl-1,3-propane diol (BEPD), and the like, as well as mixtures thereof. In one embodiment of the present invention, the chain extender consists essentially of or consists of 1,4-butanediol. In another embodiment, the chain extender component consists essentially of or consists of hydroquinone bis(2-hydroxyethyl) ether hydroquinone. In another embodiment, the chain extender component consists essentially of or consists of pentaspiro glycol. As used herein, "pentaspiro glycol" or PSG refers to a polyol such as is described in U.S. Pat. No. 2,945,008, for example, 3,9-bis(1,1-dimethyl-2-hydroxyethyl)-2,4,8,10-tetraoxaspiro[5.5]undecane represented by the Formula:

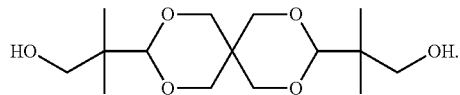

To prepare thermoplastic polyurethane compositions in accordance with the present invention, the components (the polyol, the diisocyanate, and the optional chain extender) may be reacted together to form the thermoplastic polyurethane compositions of the present invention. Any known processes to react the components may be used to make the thermoplastic polyurethane composition of the present invention. In one embodiment, the process is a so-called "one-shot" process where all three components are added to an extruder reactor and reacted.

The thermoplastic polyurethane composition of the invention can also be prepared utilizing a pre-polymer process. In the pre-polymer route, the polyol intermediates are reacted with generally an equivalent excess of one or more diisocyanates to form a pre-polymer solution having free or unreacted diisocyanate therein. Subsequently, a chain extender, as noted above, is added in an equivalent amount generally equal to the isocyanate end groups as well as to any free or unreacted diisocyanate compounds. Typically, the pre-polymer route can be carried out in any conventional device including an extruder. In such embodiments, the polyol intermediates are reacted with an equivalent excess of a diisocyanate in a first portion of the extruder to form a pre-polymer solution and subsequently the chain extender is added at a downstream portion and reacted with the pre-polymer solution.

In one embodiment, the ingredients are mixed on a single or twin screw extruder with multiple heat zones and multiple feed ports between its feed end and its die end. The ingredients may be added at one or more of the feed ports and the resulting thermoplastic polyurethane composition that exits the die end of the extruder may be pelletized.

The preparation of the thermoplastic polyurethane compositions of the invention can be done by any known conventional procedures and methods or those hereafter developed. The amounts of specific components thereof, the various reactant ratios, processing temperatures, catalysts in the amount thereof, polymerizing equipment such as the various types of extruders, and the like, would be understood by those skilled in the art.

One or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy) ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like, phenyl mercuric propionate, lead octoate, iron acetylacetonate, magnesium acetylacetonate, or bismuth compounds such as bismuth octoate, bismuth laurate, and the like.

The thermoplastic polyurethane composition of the present invention may have a Shore A hardness of 95A or less, for example, 35A to 95A, further for example, 50A to 95A.

Other optional components can be present during the polymerization reaction, and/or incorporated into the thermoplastic polyurethane composition described above to improve processing and other properties. These additives include but are not limited to antioxidants, such as phenolic types, organic phosphites, phosphines and phosphonites, hindered amines, organic amines, organo sulfur compounds, lactones and hydroxylamine compounds, biocides, fungicides, antimicrobial agents, compatibilizers, electro-dissipative or anti-static additives, fillers and reinforcing agents, such as titanium dioxide, alumina, clay and carbon black, flame retardants, such as phosphates, halogenated materials, and metal salts of alkyl benzenesulfonates, impact modifiers, such as methacrylate-butadiene-styrene ("MBS") and methylmethacrylate butylacrylate ("MBA"), mold release agents such as waxes, fats and oils, pigments and colorants, plasticizers, polymers, rheology modifiers such as monoamines, polyamide waxes, silicones, and polysiloxanes, slip additives, such as paraffinic waxes, hydro-carbon polyolefins and/or fluorinated polyolefins, and UV stabilizers, which may be of the hindered amine light stabilizers (HALS) and/or UV light absorber (UVA) types. Other additives may be used to enhance the performance of the thermoplastic polyurethane composition or blended product. All of the additives described above may be used in an effective amount customary for these substances.

These additional additives can be incorporated into the components of, or into the reaction mixture for, the preparation of the thermoplastic polyurethane composition, or after making the thermoplastic polyurethane composition. In another process, all the materials can be mixed with the thermoplastic polyurethane composition and then melted or they can be incorporated directly into the melt of the thermoplastic polyurethane composition.

The thermoplastic polyurethane compositions of the present invention or any blends thereof may also be used to prepare various articles using known techniques such as extrusion or molding. Extrusion or molding processes are well known to those of ordinary skill in the art and include but are not limited to, cast molding, cold forming matched-die molding, compression molding, foam molding, injection molding, gas-assisted injection molding, profile co-extrusion, profile extrusion, rotational molding, sheet extrusion, slush molding, spray techniques, thermoforming, transfer molding, vacuum forming, wet lay-up or contact molding, blow molding, extrusion blow molding, injection blow molding, and injection stretch blow molding or combinations thereof.

The thermoplastic polyurethane compositions of this invention may be used to make articles for applications where a thermoplastic polyurethane that is heat resistant is desired. The thermoplastic polyurethane composition may be used in parts or components for automotive, electronics, portable electronic, electronic accessories, electrical, communication, appliances and medical applications. For example, they may be used to produce components of cable insulation, automotive parts, electronics, and appliances.

Other applications may include but are not limited to protective covers; liquid line component and air ducts; architectural seals; bottle closures; furniture components; resistant and soft-feel grips for hand held devices; packaging components such as seals, bottles, cans, cups; medical and hygiene devices; cookware parts and accessories; sporting and leisure goods such as rackets, bike parts; footwear soles, toys, and general rubber parts; medical devices; sporting goods; wearable devices (watch bands, fitness trackers, nose pads for glasses); and general rubber parts.

The invention is further illustrated by the Examples below. In the Examples, PCL-BDO (2000) refers to a polyol component made from the reaction 0.84 mole of ε-caprolactone initiated with 0.052 mole of 1,4-butanediol. PCL-PDMS (3500) refers to a polyol component made from the reaction of 0.35 mole of ε-caprolactone initiated with 0.029 mole of linear polydimethylsiloxane propylhydroxy copolymer, BDO refers to 1,4-butane diol, HQEE refers to hydroquinone bis-(2-hydroxyethyl) ether, MDI refers to 4,4'-methylenebis(phenyl isocyanate), HDI refers to hexamethylene diisocyanate. Molar calculations are based on making 100 g of polycaprolactone polyol.

A series of comparative thermoplastic polyurethane compositions were formed by reacting the components noted in Table 1.

TABLE 1

|  | C1 | C2 | C3 |
|---|---|---|---|
| Polyol (MW) | Silicone Rubber | PCL-BDO (2000) | PCL-BDO (2000) |
| Diisocyanate |  | MDI | HDI |
| Hard Segment (%) |  | 30 | 33 |
| Chain Extender |  | BDO | BDO |
| Hardness (Shore A) | 60 | 85 | 85 |
| Compression Set (100° C.@22 h) (ASTM 395B) | Measurement not possible, the sample is not optimum dimensions | 63 | 78 |
| TMA[1] (Onset ° C.) | 135° C. | 140° C. | 122° C. |
| Microwave Test (900 w -30 sec)[2] (Visual evaluation) | EXCELLENT: No change in shape or size | POOR: Total deformation or melting of sample | POOR: Total deformation or melting of sample |

[1]Thermomechanical Analysis: Thermograms were recorded over a temperature range of −25° C. to 250° C. on a Mettler TMA/SDTA 2+ Unit. Analysis was carried out at a heating rate of 10° C./min. The plaques were used as a sample in a test penetration type. The applied force was 0.02N.

A series of inventive thermoplastic polyurethane compositions were formed by reacting the components noted in Table 2.

TABLE 2

|  | EX. 1 | EX. 2 | EX. 3 | EX. 4 | EX. 5 | EX. 6 |
|---|---|---|---|---|---|---|
| Polyol (MW) | PCL-PDMS (3500) | PCL-PDMS (3500) | PCL-PDMS (3500) | PCL-PDMS (3500) | PCL-PDMS (3500) | PCL-PDMS (3500) |
| Diisocyanate | MDI | MDI | MDI | HDI | HDI | HDI |
| Hard Segment (%) | 10 | 30 | 40 | 33 | 10 | 17 |
| Chain Extender | BDO | BDO | HQEE | BDO | BDO | BDO |
| Hardness (Shore A) | 50 | 88 | 95 | 90 | 50 | 70 |
| Compression Set (100° C.@22 h) (ASTM 395B) | 62 | 48 | 37 | 47 | 60 | 57 |
| TMA[1] (Onset ° C.) | 225° C. | Not tested | 235° C. | 210° C. | 202° C. | 206° C. |
| Microwave Test (900 w -30sec)[2] (Visual Evaluation) | FAIR: Small shape deformation, minor change in size | GOOD: Shape is maintained, little to no change in size | GOOD: Shape is maintained, little to no change in size | GOOD: Shape is maintained, little to no change in size | FAIR: Small shape deformation, minor change in size | GOOD: Shape is maintained, little to no change in size |

As shown by the tables above, the inventive thermoplastic polyurethane compositions provide superior results, particularly with respect to heat resistance, over silicone rubber material alone and other polycaprolactone based thermoplastic polyurethanes.

What is claimed is:

1. A thermoplastic polyurethane composition comprising the reaction product of:
   (a) a polyol component comprising

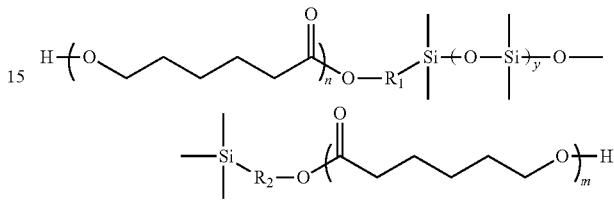

where n and m are individually 0 to 15, provided that n+m is 12 to 15, y is 25 to 33, and $R_1$ and $R_2$ are the same or different and are selected from linear or branched $C_1$ to $C_{10}$ groups; and
   (b) a diisocyanate.

2. The thermoplastic polyurethane composition of claim 1, wherein $R_1$ and $R_2$ are the same or different and are selected from methyl, ethyl, n-propyl, iso-propyl, n-butyl, iso-butyl, phenyl, cyclohexyl, methoxyethyl, or 3,3'-oxidipropyl.

3. The thermoplastic polyurethane composition of claim 1, further comprising a chain extender component.

4. The thermoplastic polyurethane composition of claim 2 wherein the chain extender consists of 1,4-butanediol.

5. The thermoplastic polyurethane composition of claim 2, wherein the chain extender consists of hydroquinone bis-(2-hydroxyethyl) ether.

6. The thermoplastic polyurethane composition of claim 1, wherein the diisocyanate consists of 4,4'-methylenebis (phenyl isocyanate).

7. The thermoplastic polyurethane composition of claim 1, wherein the diisocyanate consists of hexamethylene diisocyanate.

8. An article made from the thermoplastic polyurethane composition of claim 1.

9. A method of increasing the heat resistance of an article comprising the steps of:
(i) reacting (a) a polyol component comprising

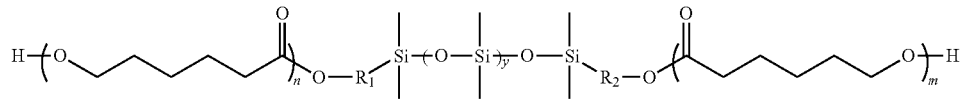

where n and m are individually 0 to 15, provided that n+m is 12 to 15, y is 25 to 33, and R1 and R2 are the same or different and are selected from linear or branched $C_1$ to $C_{10}$ groups; and
(b) a diisocyanate;
(ii) forming an article by extrusion or molding.

10. The method of claim 9, wherein R1 and R2 are the same or different and are selected from methyl, ethyl, n-propyl, iso-propyl, n-butyl, iso-butyl, phenyl, cyclohexyl, methoxyethyl, or 3,3'-oxidipropyl.

\* \* \* \* \*